US012657070B2

(12) United States Patent (10) Patent No.: US 12,657,070 B2
Ruan (45) Date of Patent: Jun. 16, 2026

(54) PROCESSING METHODS, SYSTEMS, DEVICES, AND STORAGE MEDIUMS IN DISTRIBUTED FRAMEWORKS

(71) Applicant: ZHEJIANG DAHUA TECHNOLOGY CO., LTD., Hangzhou (CN)

(72) Inventor: Liang Ruan, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 620 days.

(21) Appl. No.: 18/178,450

(22) Filed: Mar. 3, 2023

(65) Prior Publication Data

US 2023/0281059 A1    Sep. 7, 2023

(30) Foreign Application Priority Data

Mar. 3, 2022    (CN) .......................... 202210203540.4

(51) Int. Cl.
*G06F 9/50* (2006.01)
(52) U.S. Cl.
CPC .......... *G06F 9/5077* (2013.01); *G06F 9/5088* (2013.01); *G06F 2209/503* (2013.01)
(58) Field of Classification Search
CPC ................. G06F 9/5077; G06F 9/5088; G06F 2209/503; G06F 2209/502; G06F 9/5027; G06F 9/4881; G06F 9/45558; G06F 9/5066; G06F 9/5083; G06F 2009/45562
See application file for complete search history.

(56) References Cited

U.S. PATENT DOCUMENTS

| | | | | |
|---|---|---|---|---|
| 2017/0329648 A1* | 11/2017 | Ren | .......................... | H04L 69/16 |
| 2022/0237202 A1* | 7/2022 | Orun | ...................... | G06F 16/254 |
| 2022/0308849 A1* | 9/2022 | Kumar | ...................... | G06F 8/61 |

FOREIGN PATENT DOCUMENTS

| | | |
|---|---|---|
| CN | 109117259 A | 1/2019 |
| CN | 110941474 A | 3/2020 |
| CN | 112199194 A | 1/2021 |
| CN | 113590255 A | 11/2021 |

OTHER PUBLICATIONS

Tan, Li et al., An Improved Kubernetes Priority Algorithm based on Load Balancing, Journal of Chengdu University of Information Technology, 2019, 5 Pages.
First Office Action in Chinese Application No. 202210203540.4 mailed on May 19, 2025, 10 pages.

* cited by examiner

*Primary Examiner* — Sisley N Kim
(74) *Attorney, Agent, or Firm* — METIS IP LLC

(57) ABSTRACT

The embodiments of the present disclosure may disclose processing methods, systems, devices, and storage mediums in a distributed framework. The processing method may include: obtaining a position of first data resource; and allocating a ProcessPod to one of the one or more Nodes based on the position of the first data resource and recording an allocation result.

15 Claims, 8 Drawing Sheets

100

100

200

S220, Allocating a ProcessPod to one of the one or more Node based on the position of the first data resource and recording an allocation result S210, obtaining a position of first data resource S230, determining second data resource for mounting based on the allocation result

400

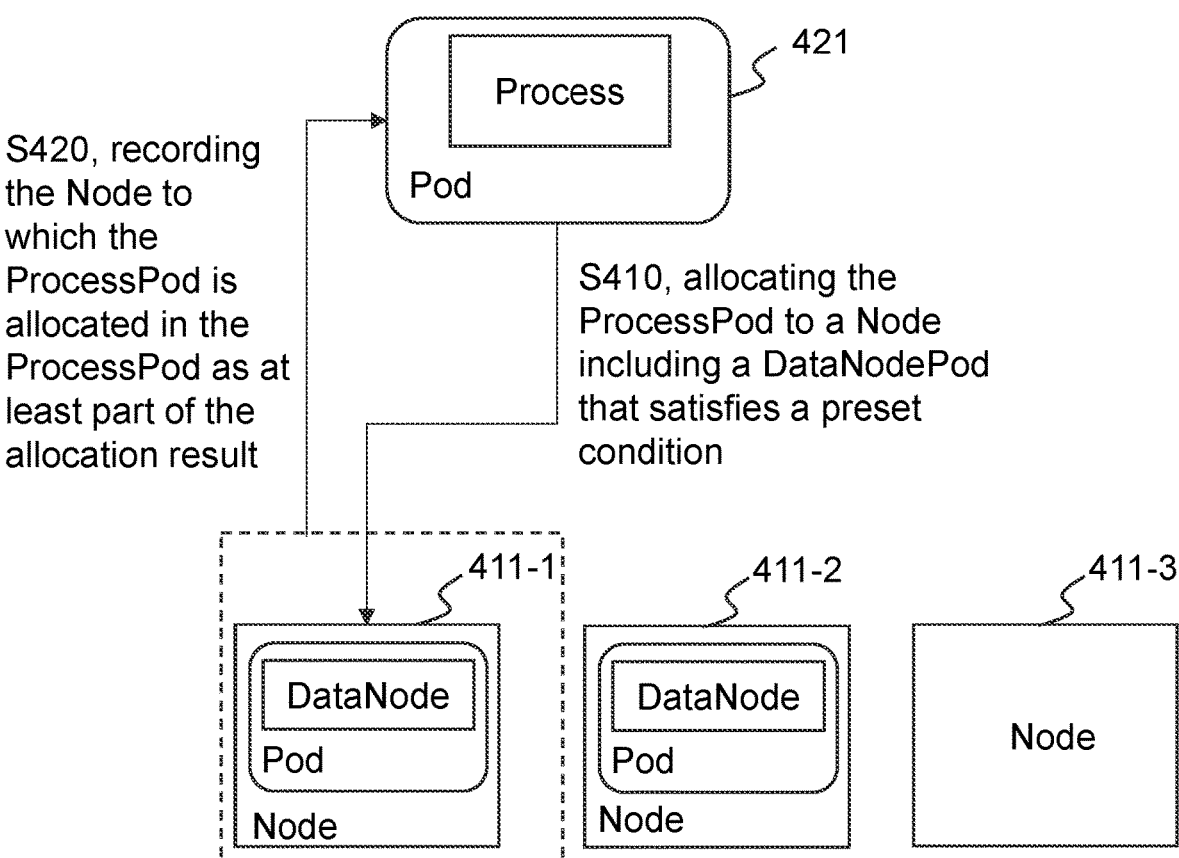

S420, recording the Node to which the ProcessPod is allocated in the ProcessPod as at least part of the allocation result S410, allocating the ProcessPod to a Node including a DataNodePod that satisfies a preset condition S430, determining a DataNodePod for access based on a corresponding relationship between the ProcessPod, the DataNodePod, and the Node in the allocation result

Obtaining module
<u>810</u>

Allocation module
<u>820</u>

Task obtaining module
<u>910</u>

Resource generation
module
<u>920</u>

Resource scheduling
module
<u>930</u>

FIG. 9

PROCESSING METHODS, SYSTEMS, DEVICES, AND STORAGE MEDIUMS IN DISTRIBUTED FRAMEWORKS

CROSS-REFERENCE TO RELATED APPLICATIONS

This application claims priority of Chinese Patent Application No. 202210203540.4 filed on Mar. 3, 2022, the entire contents of which are hereby incorporated by reference.

TECHNICAL FIELD

The present disclosure relates to the field of distributed processing, and in particular, to processing methods, systems, devices, and storage mediums in a distributed framework.

BACKGROUND

At present, the big data system has become an important tool for data management. The distributed scheduling framework is an important component of the big data system such as Yarn, Kubernetes (K8s), etc., responsible for the distribution and scheduling of various tasks. It is desirable to provide processing methods and systems for a distributed framework to improve efficiency of task scheduling and resource utilization.

SUMMARY

One of the embodiments of the present disclosure provides a processing method in a distributed framework. The method may include obtaining a position of first data resource, the first data resource being located on one or more Nodes; and allocating a ProcessPod to one of the one or more Nodes based on the position of the first data resource and recording an allocation result, the ProcessPod being a Pod obtained by encapsulating a Process.

In some embodiments, the first data resource may include one or more DataNodePods. The ProcessPod may be allocated to a Node including a DataNodePod that satisfies a preset condition. The preset condition may include that a preset position of the ProcessPod matches the position of the DataNodePod. The Node to which the ProcessPod is allocated in the ProcessPod may be recorded as at least part of the allocation result.

In some embodiments, the method may further include: determining a DataNodePod for access based on a corresponding relationship between the ProcessPod, the DataNodePod, and the Node in the allocation result.

In some embodiments, the method may further include: determining second data resource for mounting based on the allocation result.

In some embodiments, the second data resource may include a persistent volume (PV).

In some embodiments, the method may be executed by a revised Kubernetes. The revised Kubernetes may include a ResourceManager, a NodeManager, a Yarndeployment, and a Master. The method may further include: obtaining a Task by the ResourceManager; generating a YarnPod based on the Task by the NodeMangager; generating the ProcessPod by the Yarndeployment based on the position of the first data resource when the Yarndeployment detects that the YarnPod is generated; and parsing the ProcessPod by the Master and allocating the ProcessPod to the one of the one or more Nodes including the first data resource based on the position of the first data resource.

One of the embodiments of the present disclosure provides another processing method in a distributed framework. The method may include: obtaining a Task; obtaining a container group resource by creating a Kubernetes controller and a YarnPod and processing the YarnPod using the Kubernetes controller, wherein the Task corresponds to the Yarn-Pod; and scheduling the container group resource using the Kubernetes controller and scheduling the container group resource to a preset Node, wherein the preset Node is deployed with a DataNodePod, and the DataNodePod is a container group served by a data node in a Hadoop Distributed File System (HDFS) cluster.

In some embodiments, parsed data may be obtained by parsing the YarnPod using the Kubernetes controller. The container group resource may be created based on the parsed data.

In some embodiments, the YarnPod may include an annotation field. The parsed data may include a first prefix field and a second prefix field. The first prefix field may be a name prefix of a container group served by the data node. The second prefix field may be a prefix of a persistent volume mounted on the container group resource. The method may further include: obtaining the first prefix field and the second prefix field by parsing the annotation field; obtaining address information of the DataNodePod based on the first prefix field; injecting the address information into the container group resource through an environment variable; obtaining a persistent volume prefix by parsing the second prefix field, wherein the persistent volume prefix is the prefix of the persistent volume mounted on the container group resource; and selecting a persistent volume with a same prefix as the persistent volume prefix from a persistent volume resource to make the container group resource running on the preset Node mount to the selected persistent volume.

In some embodiments, the method may further include: determining whether the selected persistent volume exists; in response to a determination that the selected persistent volume does not exist, creating a new persistent volume; and creating the container group resource based on the address information and the new persistent volume.

In some embodiments, the container group resource may include at least one container group. The method may further include: determining whether a ratio of a count of Nodes in a Kubernetes cluster to a count of the at least one container group is greater than a preset value; and in response to a determination result that the ratio is greater than the preset value, scheduling all container groups corresponding to the Task to the preset Node.

In some embodiments, the HDFS cluster may further include a client terminal. The container group resource may be used to run the client terminal. The method may further include: selecting, based on an environment variable, a data node from all data nodes using the client terminal to read and/or write data to be processed.

In some embodiments, a data node may be selected from all the data nodes as a candidate data node. The client terminal may be used to determine whether the obtained candidate data node is deployed on a same Node as the client terminal based on the environment variable. In response to a determination result that the obtained candidate data node is deployed on a same Node as the client terminal, the data to be processed may be read and/or written using the candidate data node. In response to a determination result that the obtained candidate data node is not deployed on a same Node as the client terminal, the step of selecting a data node from all the data nodes as a candidate data node may be returned to until a preset termination condition is satisfied.

In some embodiments, the YarnPod may be created using a NodeManager in a Yarn cluster.

One of the embodiments of the present disclosure provides a system. The system may include at least one storage device storing a set of instructions for performing processing method in a distributed framework; and at least one processor configured to communicate with the at least one storage device. When executing the set of instructions, the at least one processor may be configured to direct the system to perform operations including: obtaining a position of first data resource, the first data resource being located on one or more Nodes; and allocating a ProcessPod to one of the one or more Nodes based on the position of the first data resource and recording an allocation result, the ProcessPod being a Pod obtained by encapsulating a Process.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

In some embodiments of the present disclosure, a hybrid scheduling architecture of the Yarn and the Kubernetes may be constructed by encapsulating a process in the Yarn as a Pod in the Kubernetes (or referred to as a ProcessPod herein). The ProcessPod container group resource corresponding to a Task may be obtained by processing the custom YarnPod using a custom Kubernetes controller and the generated ProcessPod container group resource may be scheduled to a Node with a DataNodePod, so that deployment and scheduling of the Task can be realized. The scheduling logic may be controlled by the Kubernetes cluster using the Kubernetes controller to schedule the Task, thereby improving the balance of scheduling. The container group resource (e.g., the ProcessPod) and the DataNodePod may be deployed on the same Node, so that the data node on the same Node may be directly used to read and write data, which can help to improve the performance of data reading and writing.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, wherein:

FIG. 4 is a flowchart illustrating an exemplary process of a processing method in a distributed framework according to some embodiments of the present disclosure;

FIG. 8 is a schematic diagram illustrating an exemplary processing system in a distributed framework according to some embodiments of the present disclosure; and FIG. 9 is a schematic diagram illustrating an exemplary processing system in another distributed framework according to some embodiments of the present disclosure.

DETAILED DESCRIPTION

Figure 1:
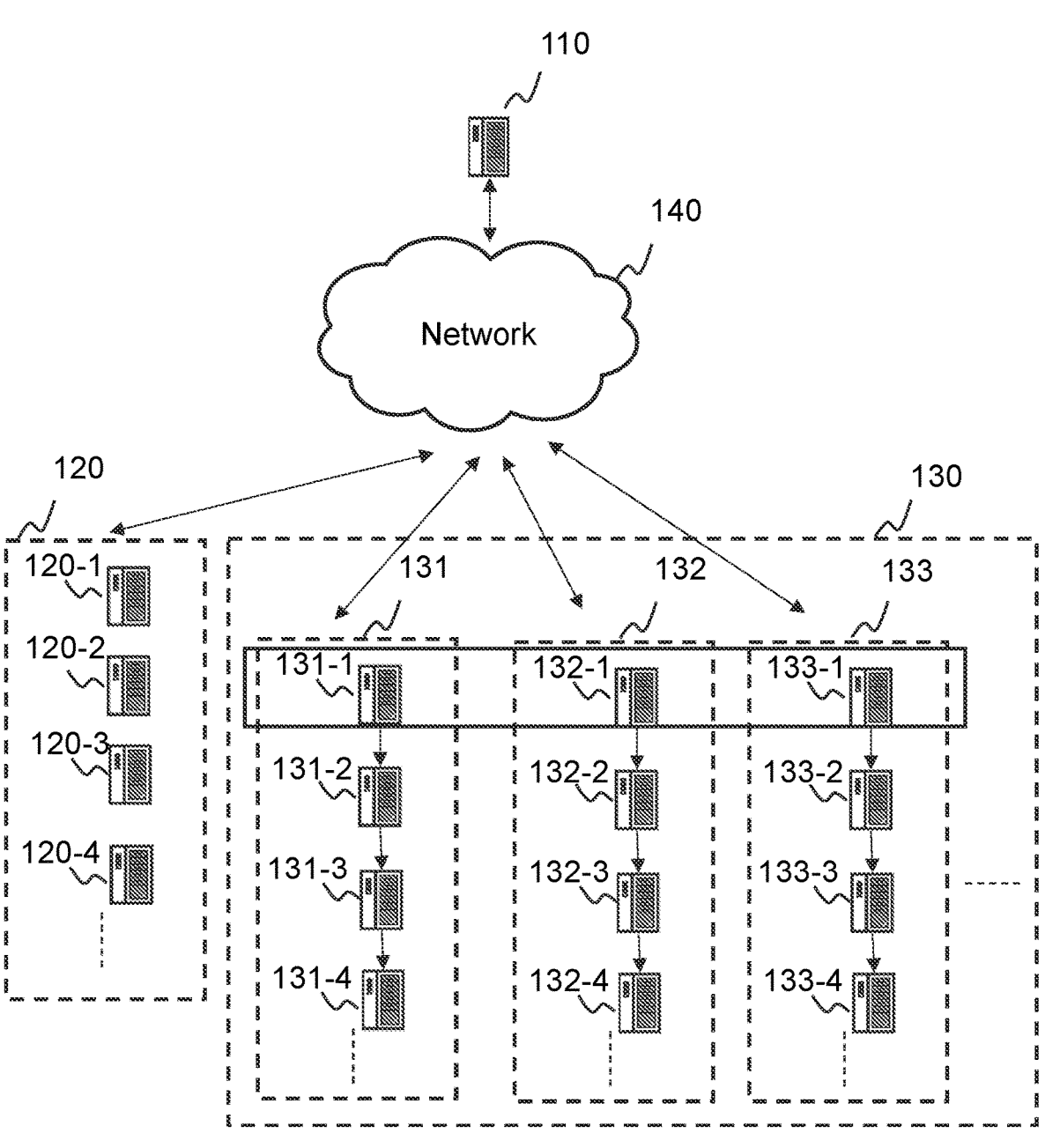
FIG. 1 is a schematic diagram illustrating an exemplary application scenario of a processing system in a distributed framework according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating an exemplary application scenario of a processing system in a distributed framework according to some embodiments of the present disclosure.

As shown in FIG. 1, in some embodiments, the processing system 100 in the distributed framework (hereinafter referred to as the system 100) may include a client terminal node 110, a master node 120, a slave node 130, and a network 140.

The client terminal node 110 may generate a Task to be processed. In some embodiments, the client terminal node 110 may include a client terminal. A user may generate the Task through the client terminal. The client terminal node 110 may send the Task to the master node 120 to allocate the Task to a certain slave node 130. The client terminal node 110 may exchange data with the certain slave node 130 based on a scheduling and allocation result of the Task. The client terminal node 110 may include one or more. Any two or more of the client terminal node 110, the master node 120, and the slave node 130 may be located on a same Node (i.e., a physical device). A Node used herein may include a computing device including various processors and storages, or any combination thereof.

The master node 120 may schedule and allocate the Task. In some embodiments, the master node 120 may receive the Task sent by the client terminal node 110 and allocate the Task to the slave node 130 by executing the processing method in the distributed framework shown in some embodiments of the present disclosure. In some embodiments, the Task may include a process, a container (e.g., a Pod), etc. In some embodiments, the master node 120 may include a plurality of nodes such as 120-1, 120-2, 120-3, 120-4, etc. In some embodiments, the master node 120 may include various types of nodes such as a NameNode, a Secondary NameNode, a ResourceManager, a HBase Master, etc. in a Hadoop. The different types of nodes may be located on one or more Nodes.

The slave node 130 may execute the Task and provide resources (e.g., computing resource, storage resource, etc.). In some embodiments, the slave node 130 may perform various operations (e.g., computation, data storage, data obtaining, etc.) specified by the Task. In some embodiments, the slave node 130 may include various types of worker nodes such as a DataNode, a NodeManager, a HBase Regionserver, etc. in the Hadoop. In some embodiments, each type of worker node may include multiple work nodes. For example, the worker nodes 131, 132, and 133 may be different types of worker nodes. The worker nodes 131 may include 131-1, 131-2, 131-3, 131-4, etc. The worker nodes 132 may include 132-1, 132-2, 132-3, 132-4, etc. The worker nodes 133 may include 133-1, 133-2, 133-3, 133-4, etc. In some embodiments, the slave node 130 may include multiple slave nodes. Each slave node 130 may include a group of different types of worker nodes such as a group of worker nodes 131-1, 132-1, and 133-1. In some embodiments, the DataNode, etc. on a slave node 130 may be allocated with a specific Task.

The network 140 may connect various components of the system and/or connect the system with external resource. The network 140 may enable communication between the components of the system 100 and with other components outside the system 100, facilitating the exchange of data and/or information. In some embodiments, the one or more components in the system 100 (e.g., the client terminal node 110, the master node 120, the slave node 130) may send data and/or information to other components through the network 140. In some embodiments, the network 140 may include a wired network, a wireless network, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. The features, structures, methods, and other features of the exemplary embodiments described in the present disclosure may be combined in various ways to obtain additional and/or alternative exemplary embodiments. For example, the client terminal node 110, the master node 120, and the slave node 130 may have their own storage components or may share a storage device (e.g., cloud storage, etc.). However, those variations and modifications do not depart from the scope of the present disclosure.

Figure 2:
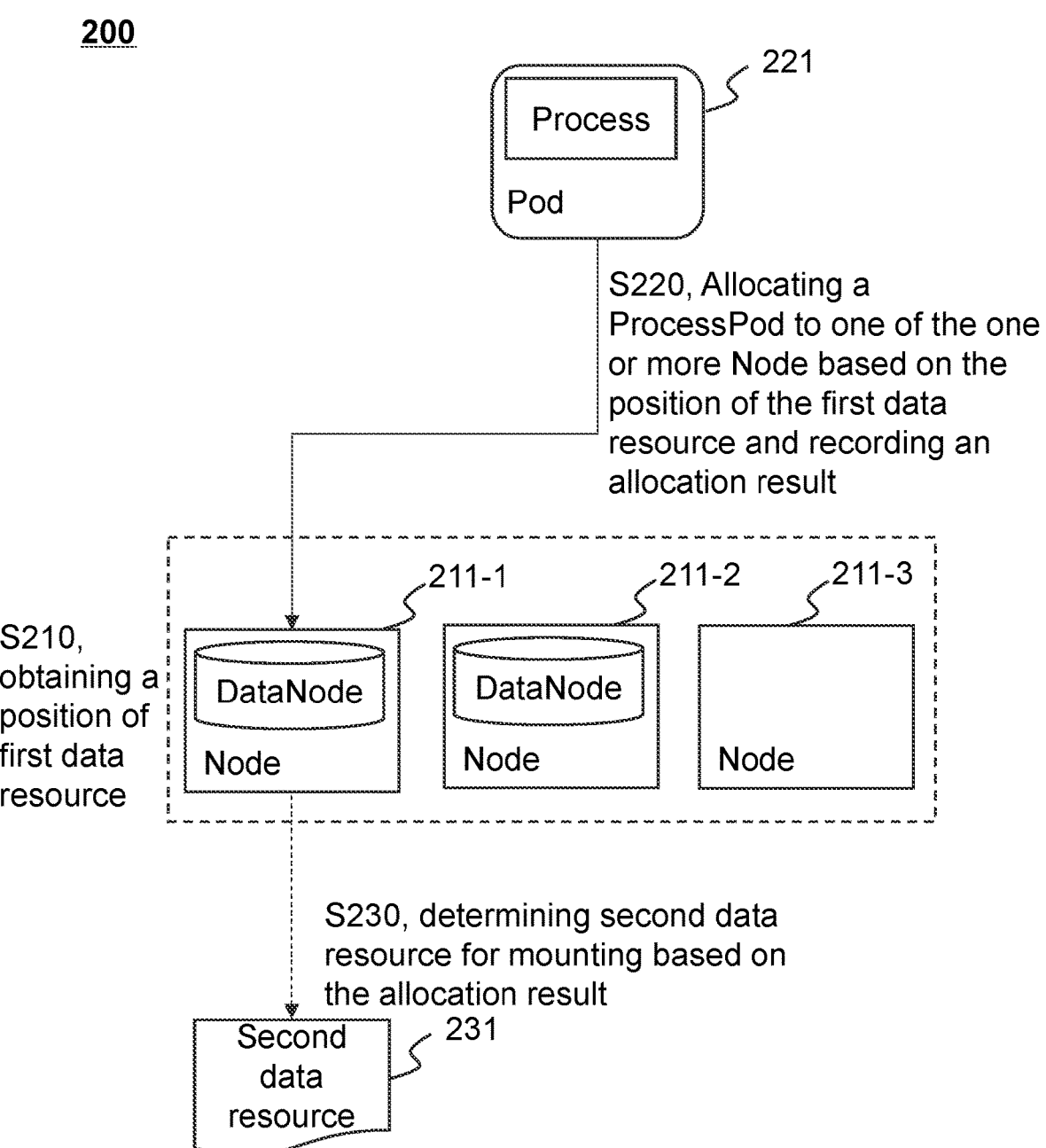
FIG. 2 is a flowchart illustrating an exemplary process of a processing method in a distributed framework according to some embodiments of the present disclosure.

FIG. 2 is a flowchart illustrating an exemplary process of a processing method in a distributed framework according to some embodiments of the present disclosure.

As shown in FIG. 2, the process 200 may include the following operations. In some embodiments, the process 200 may be performed by the master node 120.

In S210, a position of first data resource may be obtained. The first data resource may be located on one or more Nodes.

The first data resource may include any resources used in data manipulation (e.g., data retrieval, data storage, data processing, etc.). For example, the first data resource may include resource for data access (such as a DataNode, etc.), resource for data storage (such as a persistent volume (PV), etc.), or the like. In some embodiments, the first data resource may be in various forms such as a process, a container, etc. For example, in a Yarn, the DataNode may be in the form of a process. As another example, in a Kubernetes, the DataNode may be encapsulated as a DataNodePod in the form of a container.

The position of the first data resource position may indicate where (which Node) the first data resource is located and may include various forms, for example, Node ID, a route identifier (e.g., a Uniform Resource Identifier (URI)), an Internet Protocol (IP) address, etc., of the one or more Nodes.

A Node may be a device that can perform data manipulation, such as a server, etc. In some embodiments, the master node 120 may obtain the position of the first data resource on the one or more Nodes. For example, for a Node deployed with a DataNode, the master node 120 may obtain the IP address of the DataNode as the position of the first data resource. In FIG. 2, there may be DataNodes on a Node 211-1 and a Node 211-2, but there may be no DataNode on a Node 211-3. Therefore, the position of the first data resource may include the IP addresses of the DataNodes on the Node 211-1 and the Node 211-2.

In S220, a ProcessPod may be allocated to one of the one or more Nodes based on the position of the first data resource, and an allocation result may be recorded.

The ProcessPod may be a container obtained by encapsulating a Process. The container may include various types of containers, for example, a Pod, Docker, etc. in the Kubernetes. In the distributed task scheduling framework Yarn, the container may include a ResourceManager and a NodeManager. The ResourceManager may play a role of a master node. The NodeManager may play a role of a slave node. The Task may be in the form of a Process. A unit of Task allocation may be the Process. The ResourceManager may allocate the Process to a NodeManager node. The NodeManager node may run the Process. In another distributed task scheduling framework Kubernetes, the Task may be encapsulated as a Pod. The unit of Task allocation may be the Pod. The Pod may be composed of one or more containers in a Linux. The master node in the Kubernetes may allocate the Pod to a Node for running.

Figure 3:
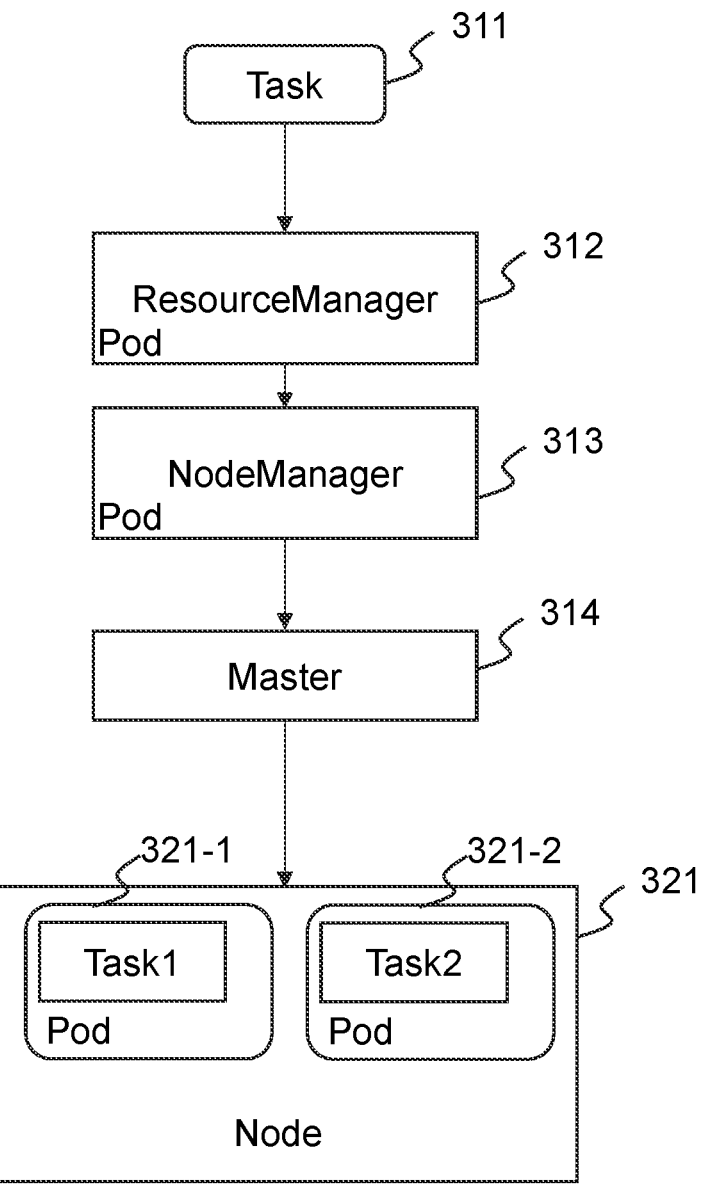
FIG. 3 is a schematic diagram illustrating an exemplary hybrid scheduling architecture of a Yarn and a Kubernetes according to some embodiments of the present disclosure.

The ProcessPod is described below with a hybrid scheduling architecture of the Yarn and the Kubernetes shown in FIG. 3. As shown in FIG. 3, the hybrid scheduling architecture may include a ResourceManager 312, a NodeManager 313, and a Master 314, wherein the ResourceManager 312 and the NodeManager 313 may be encapsulated in the form of a Pod. The ResourceManager 312 and the NodeManager 313 may belong to the Yarn scheduling architecture. The Master 314 may belong to the Kubernetes scheduling architecture. The first data resource may be DataNodePod (i.e., a DataNode in the form of a Pod). In some embodiments, the DataNodePod on a Node may be also referred to as a DataNode on the Node for brevity.

In some embodiments, the ProcessPod may be obtained by encapsulating a process in the Yarn in the form of a Pod in the Kubernetes. For example, a Task 311 in FIG. 3 may be in the form of a process. The ResourceManager 312 may divide the Task 311 into a Task 1 and a Task 2, and encapsulate the Task 1 and the Task 2 into a ProcessPod 321-1 and a ProcessPod 321-2 in the form of Pods. When scheduled as resource in the distributed framework, a ProcessPod may also be called a ProcessPod container group resource.

In some embodiments, the master node 120 may allocate the ProcessPod to one of the one or more Nodes based on the position of the first data resource and record the allocation result. The ProcessPod may be a Pod obtained by encapsulating a Process. For example, the ProcessPod may be allocated to a Node including the first data resource. As shown in FIG. 2, a ProcessPod 221 may be allocated to the Node 211-1. The Node 211-1 may be a Node including a DataNode. As shown in FIG. 3, the Master 314 may allocate the ProcessPod 321-1 and the ProcessPod 321-2 to a Node 321. The Node 321 may include a DataNodePod. More descriptions regarding allocating the ProcessPod to one of the one or more Nodes and recording the allocation result may be found in FIG. 4 and the relevant description thereof, which will not be repeated herein.

In some embodiments, the allocation result may include various information related to the allocation of the ProcessPod, for example, a corresponding relationship between the ProcessPod and a Node to which the ProcessPod is allocated, a corresponding relationship between the Node to which the ProcessPod is allocated and first data resource thereon (e.g., the DataNode), etc.

In some embodiments, after the operation S220, the master node 120 may also determine second data resource for mounting based on the allocation result through an operation S230.

The second data resource may be resource that can be used for data storage, for example, physical disk space (such as a partition, etc.), abstract storage resource (such as a PV, etc. in Kubernetes), resource related to data access (such as a DataNode, etc.), or the like. In some embodiments, the second data resource may include various forms of storage resource. For example, in the Kubernetes, the second data resource may include PV or DataNodePod. In some embodiments, the first data resource may correspond to the second data resource. For example, the first data resource may be a DataNodePod A and the second data resource corresponding to the DataNodePod A may be a PV A. As another example, the first data resource may be a PV B and the second data resource corresponding to the PV B may be a DataNodePod B. In some embodiments, when the second data resource is used for data access, it may be mounted as a partition, a volume, or the like.

In some embodiments, after obtaining the allocation result of the ProcessPod being allocated to the Node, the master node 120 may determine the second data resource for mounting according to a corresponding relationship between the ProcessPod and the first data resource to which the ProcessPod is allocated in the allocation result, and a corresponding relationship between the first data resource and the second data resource. For example, the PV to be mounted may be determined according to the IP of the DataNodePod to which the ProcessPod is allocated and a preset corresponding relationship between DataNodePod and PVs. In some embodiments, the corresponding relationship between DataNodePods and PVs may be determined based on prefix information of DataNodePod (e.g., a Pod name prefix) and a prefix information of PV (e.g., a PV name prefix). For example, a DataNodePod and a PV may be regarded as being corresponding to each other if the Pod name prefix is the same as the PV name prefix of the PV.

In some embodiments, if the first data resource includes DataNodePods and the second data resource includes PVs, the master node 120 may determine a DataNodePod to which the ProcessPod is allocated through the operation S220 and determine a PV corresponding to the DataNodePod through the operation S230.

In some embodiments, if the first data resource includes PV, and the second data resource includes DataNodePods, the master node 120 may determine a PV to which the ProcessPod is allocated through the operation S220 and determine a DataNodePod corresponding to the PV through the operation S230. For example, in the operation S220, the master node 120 may allocate the ProcessPod to a Node including the PV and record the allocation result. Then in the operation S230, according to the IP of the PV to which the ProcessPod is allocated (i.e., the IP of the Node where the PV is located) and the preset corresponding relationship between PVs and DataNodePods, the DataNodePod to which the ProcessPod is allocated may be determined.

In some embodiments of the present disclosure, the integration of different distributed task scheduling frameworks (e.g., the integration of the Yarn and the Kubernetes) can be realized by encapsulating a process used for scheduling in the distributed task scheduling framework into a container such as a Pod, wherein the process encapsulated into the container may be referred to as a ProcessPod. The ProcessPod may be scheduled to a Node with a DataNodePod, which can realize the deployment and scheduling of the Task. Since the container group resource (e.g., the ProcessPod) and the DataNodePod are deployed on the same Node, the data node on the same Node may be directly used to read and writing data, improving the performance of data access. A PV may be determined based on the preset relationship between DataNodePods and PVs, thereby achieving load balancing, ensuring that Pods running on the same Node can mount the same PV, realizing resource sharing, and further improving the performance of data access.

FIG. 4 is a flowchart illustrating an exemplary process of a processing method in a distributed framework according to some embodiments of the present disclosure.

As shown in FIG. 4, the process 400 may include the following operations. In some embodiments, the process 400 may be performed by the master node 120 and the client terminal node 110. In some embodiments, the master node 120 may perform operation S220 by performing the method shown in the process 400, so as to allocate a ProcessPod to one of the one or more Nodes based on a position of first data resource and record an allocation result. The first data resource may include one or more DataNodePods.

In S410, the ProcessPod may be allocated to a Node including a DataNodePod that satisfies a preset condition. The preset condition may include that a preset position of the ProcessPod matches the position of the first data resource (i.e., the DatallodPod) on the allocated node.

The DataNodePod may be a DataNode encapsulated as a Pod. In some embodiments, an unencapsulated DataNode may include a process, a Docker container, a Pause container, or the like, or any combination thereof. The DataNodePod may include various forms such as a process, a process combination, a container, a container combination, a combination of a process and a container, etc. In some embodiments, the DataNodePod may provide a data access (i.e., data reading and writing) service for the ProcessPod. In some embodiments, the data read and written by the DataNodePod may be stored in the PV on the Node.

A preset position of the ProcessPod refers to a preset position identifier of a target DataNodePod to which the ProcessPod will be allocated, such as an IP of the target DataNodePod, a name of the target DataNodePod, etc. In some embodiments, the preset position of the ProcessPod may match the position of the first data resource, that is, the preset position of the ProcessPod may be the same as the position of the first data resource. For example, the preset IP of the target DataNodePod in the ProcessPod may be the same as an IP of a DataNodePod to which the ProcessPod is actually allocated. In some embodiments, the preset position of the ProcessPod may be set through an environment variable, prefix information, etc. For example, IP information of the target DataNodePod may be added in the ProcessPod by setting the environment variable. The environment variable and prefix information may be fields that can be set.

In some embodiments, a custom container group resource Yarn Pod may be generated by a NodeManager in a hybrid scheduling framework of a Yarn and a Kubernetes (e.g., the framework shown in FIG. 3), and the preset position of a ProcessPod corresponding to the Yarn Pod may be specified by adding a prefix of the target DataNodePod to the Yarn Pod. For example, the prefix of the target DataNodePod may be name information of the target DataNodePod. The IP address information corresponding to the target DataNodePod may be obtained through the name information.

In some embodiments, the master node 120 may allocate the ProcessPod to the Node including the DataNodePod that satisfies the preset condition. The preset condition may include that the position of the DataNodePod in the Node matches the preset position of the ProcessPod. As shown in FIG. 4, both Node 411-1 and Node 411-2 may include DataNodePods. The Node 411-3 may not include DataNodePod. The master node 120 may assign a ProcessPod 421 to the Node 411-1. The IP of the target DataNodePod included in the environment variable of the ProcessPod 421 may be the same as the IP of the DataNodePod in the Node 411-1. That is, the DataNodePod in the Node 411-1 may be the target DataNodePod.

In some embodiments, the preset condition may be in other forms. For example, the preset condition may include that the ProcessPod is allocated to a Node including most idle DataNodePods, etc.

In S420, the Node to which the ProcessPod is allocated may be recorded in the ProcessPod as at least part of the allocation result.

In some embodiments, the master node 120 may record the Node to which the ProcessPod allocated in the ProcessPod in the form of the environment variable, etc. as part of the allocation result. For example, the environment variable NODE may be added to the ProcessPod and the environment variable NODE may record which Node the ProcessPod is allocated to.

In some embodiments, after the operation S420, the client terminal node 110 may determine a DataNodePod for access by performing operation S430.

In S430, the DataNodePod for access may be determined based on a corresponding relationship between the ProcessPod, the DataNodePod, and the Node in the allocation result.

The corresponding relationship between the ProcessPod, the DataNodePod, and the Node in the allocation result refers to a corresponding relationship between the ProcessPod and the DataNodePod to which the ProcessPod is allocated and a corresponding relationship between the ProcessPod and the Node to which the ProcessPod is allocated in the allocation result. In some embodiments, the corresponding relationship may be determined according to at least two of the corresponding relationship between the ProcessPod and the DataNodePod to which the ProcessPod is allocated, the corresponding relationship between the ProcessPod and the Node to which the ProcessPod is allocated, or a corresponding relationship between the DataNodePod and the Node. In some embodiments, the allocation result may include a plurality of environment variables of the ProcessPod, such as an environment variable DN_LIST indicating the a corresponding relationship between the IP of the DataNode and the Node, an environment variable NODE indicating which Node the ProcessPod belongs to, etc. In some embodiments, a custom controller Yarndeployment may be added to the hybrid scheduling framework of the Yarn and the Kubernetes (e.g., the framework shown in FIG. 3), the Yarndeployment may generate the ProcessPod according to a YarnPod, and add the environment variable such as the DN_LIST, the NODE, etc. to the ProcessPod.

The DataNodePod for access may be a DataNodePod that a client terminal actually accesses. In some embodiments, the DataNodePod for access may be a DataNodePod that matches the preset position of the ProcessPod. For example, the IP of the DataNodePod for access may be the same as an IP of a target DataNodePod specified in the preset position of the ProcessPod. In some embodiments, the DataNodePod for access may be a DataNodePod that does not match the preset position of the ProcessPod.

In some embodiments, the client terminal node 110 may determine a Node according to the corresponding relationship between the ProcessPod and the Node to which the ProcessPod is allocated in the allocation result (e.g., the environment variable NODE); and select a DataNodePod located on the Node from all the DataNodePods as the DataNodePod for access based on the determined Node and the corresponding relationship between the DataNodePod and the Node (e.g., the environment variable DN_LIST). In some embodiments, if there is no available DataNodePod on the Node determined based on the allocation result, a DataNodePod on other Nodes may be selected as the DataNodePod for access according to a preset rule. For example, a DataNodePod on a Node that includes most available DataNodePods may be selected.

In some embodiments of the present disclosure, the ProcessPod corresponding to the Task may be obtained by processing the custom YarnPod through the custom Kubernetes controller and the generated ProcessPod may be scheduled to the Node with the DataNodePod, so that the deployment and scheduling of the Task can be realized. The scheduling logic may be controlled by the Kubernetes cluster using the Kubernetes controller to schedule the Task, thereby improving the balance of scheduling. The actual DataNode may be selected based on the allocation result of the ProcessPod, which can help the client terminal running in the Pod select a most suitable DataNode to read and write data, thereby improving the performance of data access.

Figure 5:
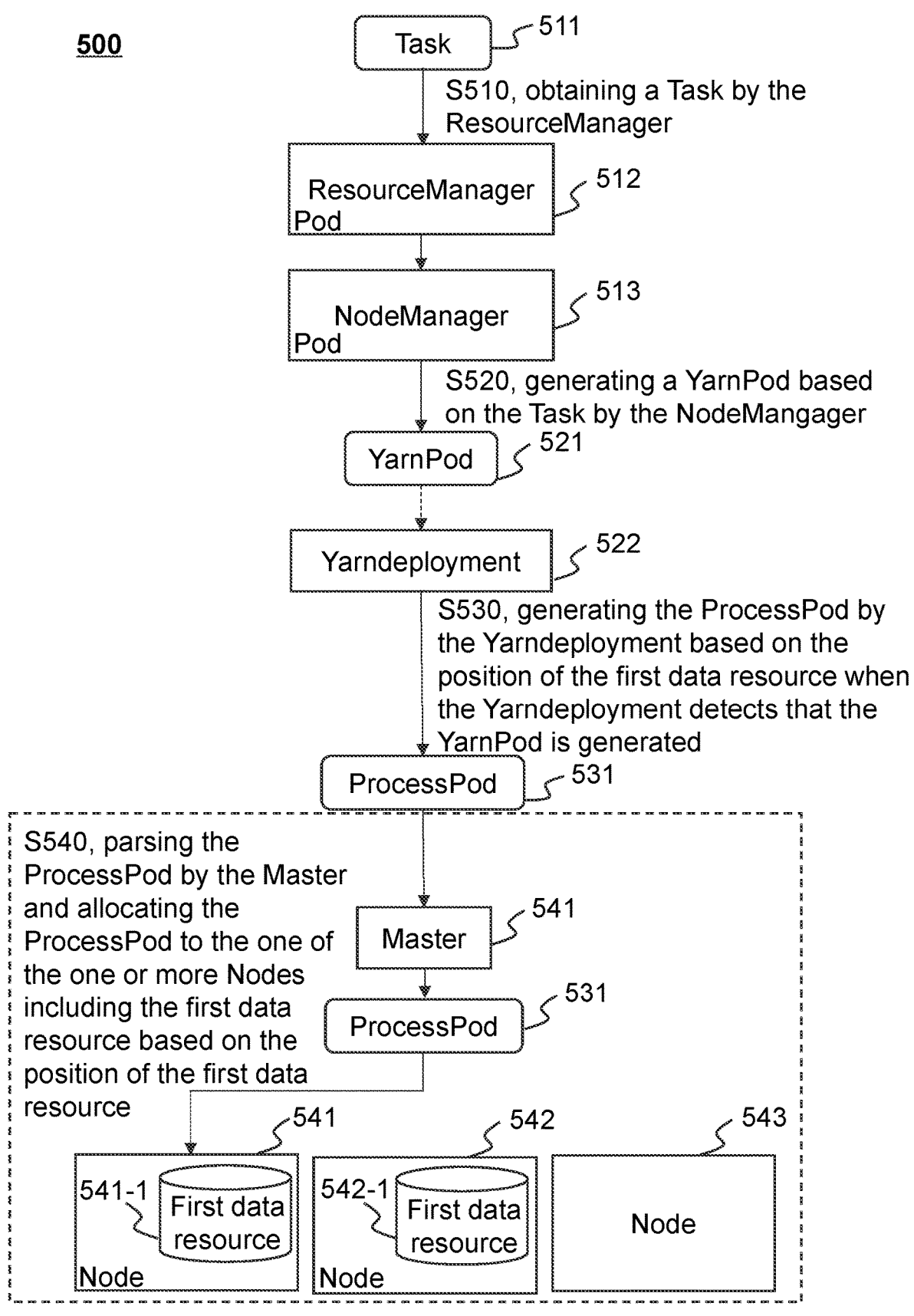
FIG. 5 is a schematic diagram illustrating an exemplary processing method in a distributed framework according to some embodiments of the present disclosure.

FIG. 5 is a schematic diagram illustrating an exemplary processing method in a distributed framework according to some embodiments of the present disclosure.

As shown in FIG. 5, the process 500 may include the following operations. In some embodiments, the process 500 may be executed by a revised Kubernetes deployed on the master node 120. In some embodiments, the revised Kubernetes on the master node 120 may implement the operations S210-S230 by executing the method shown in the process 500.

The revised Kubernetes may be a framework obtained by incorporating a feature of a Yarn framework on a Kubernetes framework. A function of an unspecified part of the revised Kubernetes may be the same as a function of a corresponding part of the Kubernetes framework or may be obtained by modifying the function of the corresponding part of the Kubernetes framework to a certain extent. In some embodiments, the revised Kubernetes may include a ResourceManager, a NodeManager, a Yarndeployment, and a Master.

In S510, a Task may be obtained through the ResourceManager.

The ResourceManager may be a resource manager in the Yarn framework, which may act as the Master in the Yarn framework and may schedule and allocate the Task processed by the Yarn framework and resources in a Hadoop Distributed File System (HDFS) cluster.

The Task refers to a task to be scheduled that requires distributed processing, such as a mathematical calculation task, an image processing task, etc. In some embodiments, the ResourceManager may obtain the Task in various ways. For example, as shown in FIG. 5, the Task 511 may be submitted by a HDFS client terminal to the ResourceManager 512 in the Yarn framework based on access to the HDFS client terminal from a user (which may be a conventional manner when the Yarn framework obtains the Task, hereinafter referred to as a conventional manner).

In S520, a YarnPod may be generated based on the Task by the NodeManager.

The NodeManager may be a node manager in the Yarn framework, which may act as a slave in the Yarn framework, manage all container groups on a Node, and may also generate the YarnPod based on the Task.

The YarnPod may be a YarnPod container group resource corresponding to the Task. In some embodiments, the YarnPod may be a Pod including the Task. In some embodiments, the YarnPod may include an annotation field. In some embodiments, the annotation field may include a first prefix field and a second prefix field. The first prefix field may include a name prefix of a container group served by a data node in a current environment. The second prefix field may include a prefix of a PV that a ProcessPod needs to mount in the current environment.

In some embodiments, the first prefix field may be denoted as a DataNodePodPrefix field and the second prefix field may be denoted as a MountPVPrefix field. A format corresponding to the YarnPod may be similar to that of the Pod. A difference may be that the DataNodePodPrefix field and the MountPVPrefix field may be added in the annotation field of the YarnPod, which may be used when a Kubernetes controller parses the YarnPod to generate a container group resource (e.g., a ProcessPod).

In some embodiments, the YarnPod may be created in various ways (e.g., through the NodeManager, the revised Kubernetes, etc.). As shown in FIG. 5, in some embodiments, the NodeManager 513 may issue a YarnPod creation request based on a preset YarnPod creation rule and the revised Kubernetes may create, based on the request, the YarnPod 521 corresponding to the request.

In S530, the ProcessPod may be generated by the Yarndeployment based on a position of first data resource when the Yarndeployment detects that the YarnPod is generated.

The Yarndeployment may be a custom Kubernetes controller. In some embodiments, the Yarndeployment may detect whether the YarnPod is generated in a Kubernetes cluster and obtain the ProcessPod by processing the generated YarnPod.

As shown in FIG. 5, in some embodiments, the ProcessPod may be generated in the following way. The Yarndeployment 522 may detect that a new YarnPod 521 is generated and parse an annotation field corresponding to the new YarnPod 521; obtain IP information (the position of the first data resource) of the one or more DataNodePods (i.e., the first data resource) in the current environment according to the first prefix field and inject the IP information into the ProcessPod 531 through an environment variable DN_LIST (representing a corresponding relationship between the IP information of the one or more DataNodePods in the current environment and one or more Nodes); inject an environment variable NODE (indicating which Node the ProcessPod belongs to) into the ProcessPod 531; and combined with a load balancing strategy, select a PV with a same prefix as the second prefix field according to the second prefix field and inject information of the PV into the ProcessPod 531 to obtain a complete ProcessPod 531. The load balancing strategy may include various strategies that can be used to achieve load balancing.

In S540, the ProcessPod may be parsed by the Master, and the ProcessPod may be allocated to the one of the one or more Nodes including the first data resource based on the position of the first data resource.

The Master may be a main node in the Kubernetes cluster. In some embodiments, the Master may parse the ProcessPod and allocate the ProcessPod to a corresponding Node including the first data resource. For example, as shown in FIG. 5, the Master 541 may parse the ProcessPod 531 and allocate the ProcessPod 531 to the Node 541. The Node 541 and a Node 542 may be respectively deployed with the first data resource 541-1 and the first data resource 542-1. A Node 543 may not include first data resource.

In some embodiments, the Master may parse the environment variable in the ProcessPod and determine the corresponding relationship between the IP information of the one or more DataNodePods in the current environment and the one or more Nodes (e.g., a corresponding relationship between the Node 541 and the first data resource 541-1) and which node the ProcessPod will be allocated to.

In some embodiments, the Master may schedule the ProcessPod to the Node that has been already deployed with the DataNodePod (the first data resource) based on the load balancing strategy. For example, as shown in FIG. 5, the processPod 531 may be allocated to the Node 541.

Figure 6:
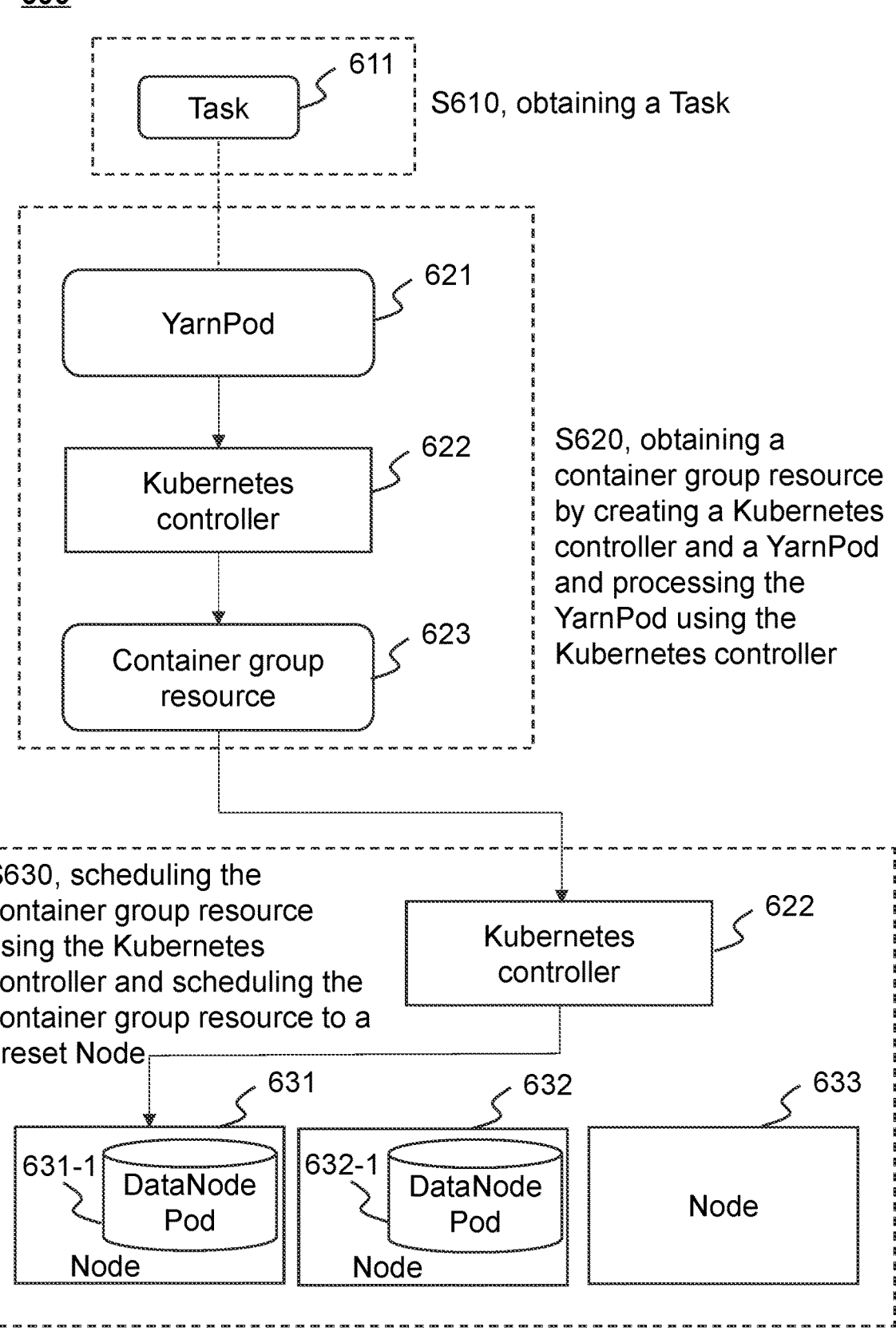
FIG. 6 is a flowchart illustrating another exemplary process of a processing method in a distributed framework according to some embodiments of the present disclosure.

FIG. 6 is a flowchart illustrating another exemplary process of a processing method in a distributed framework according to some embodiments of the present disclosure.

As shown in FIG. 6, the process 600 may include the following operations. In some embodiments, the process 600 may be performed by the master node 120.

In S610, a Task may be obtained.

The Task may be a task that needs to be scheduled currently (e.g., Task 611 in FIG. 6). In some embodiments, the Task may be obtained based on a conventional manner.

More descriptions regarding the conventional manner may be found in FIG. 5, which will not be repeated herein.

In S620, a container group resource may be obtained by creating a Kubernetes controller and a Yarn Pod and processing the YarnPod using the Kubernetes controller.

In some embodiments, the Task may correspond to the Yarn container group resource (i.e., YarnPod). In some embodiments, the Kubernetes controller (e.g., a Yarndeployment) may detect the YarnPod in a Kubernetes cluster and process (e.g., parse, convert, etc.) the YarnPod to obtain the container group resource. The container group resource may include resource encapsulated as a Pod including the ProcessPod, etc. For example, as shown in FIG. 6, the Kubernetes controller 622 may parse the Yarn Pod 621 into a corresponding resource format to obtain the container group resource 623. The Kubernetes controller 622 may schedule the container group resource 623.

In some embodiments, the Yarn Pod may be created using a NodeManager in a Yarn cluster. More descriptions regarding the manner of creating the YarnPod using the NodeManager may be found in the relevant description of FIG. 5, which will not be repeated herein.

In S630, the container group resource may be scheduled using the Kubernetes controller and the container group resource may be scheduled to a preset Node.

The preset Node may be a Node deployed with a DataNodePod. The DataNodePod may be a container group served by a data node in a HDFS cluster.

In order to achieve scheduling of the container group resource corresponding to the Task, in some embodiments, the Kubernetes controller may be used to schedule the container group resource and deploy the container group resource to a Node that has already have the DataNodePod (The Node may be the preset Node), so as to use the preset Node to execute the Task. For example, as shown in FIG. 6, the Kubernetes controller 622 may deploy the container group resource 623 to the Node 631 that has already have the DataNodePod 631-1. The Node 631 may be the preset Node. The Node 632 that has already have the DataNodePod 632-1 and the Node 633 that has no DataNodePod may not be the preset Nodes.

In some embodiments, the Task may include a plurality of subtasks. These subtasks may be deployed to a same Node for execution or may be allocated to different Nodes for execution. For example, assuming that the Task includes 5 subtasks (Task 1 to Task 5) and there are two Nodes (Node 1 and Node 2), the subtasks of Task 1, Task 2, and Task 3 may be deployed to the Node 1 and the subtasks of Task 4 and Task 5 may be deployed to the Node 2 for execution.

In some embodiments of the present disclosure, the deployment and scheduling of the Yarn Task can be optimized through the hybrid scheduling framework of the Kubernetes and the Yarn. The Task may be scheduled by the Kubernetes controller, which can improve the balance of scheduling. The container group resource (e.g., ProcessPod) and the DataNodePod may be deployed on the same Node, so that the data node on the same Node as the container group resource may be directly used to read and write data, which can improve the performance of processing the distributed task.

Figure 7:
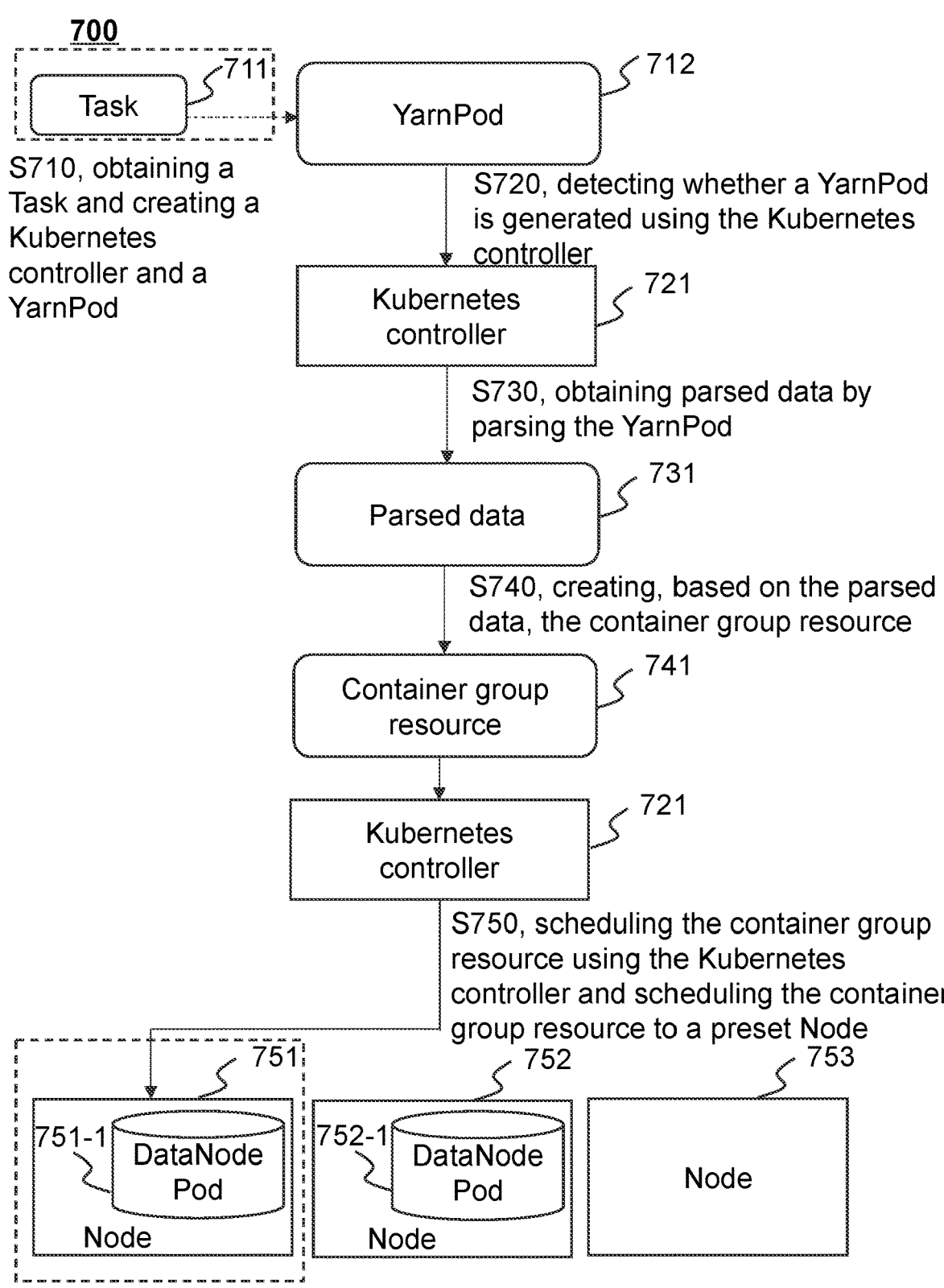
FIG. 7 is a flowchart illustrating still another exemplary process of a processing method in a distributed framework according to some embodiments of the present disclosure.

FIG. 7 is a flowchart illustrating still another exemplary process of a processing method in a distributed framework according to some embodiments of the present disclosure.

As shown in FIG. 7, the process 700 may include the following operations. In some embodiments, the process 700 may be performed by the master node 120.

In S710, a Task may be obtained and a Kubernetes controller and a YarnPod may be created.

More descriptions regarding the obtaining a Task may be found in the relevant description in FIG. 5, which will not be repeated herein. More descriptions regarding the creating a Kubernetes controller and a YarnPod may be found in the relevant description of the operation S620, which will not be repeated herein.

As shown in FIG. 7, in some embodiments, the YarnPod 712 may be similar to the YarnPod 621 and may be a YarnPod obtained by encapsulating the Task 711. More descriptions regarding the YarnPod may be found in the relevant description of FIG. 5, which will not be repeat herein.

In S720, whether a YarnPod is generated may be detected using the Kubernetes controller.

As shown in FIG. 7, in some embodiments, after the Kubernetes controller 721 is created, the Kubernetes controller 721 may be used to detect in real time whether a new YarnPod (e.g., the YarnPod 712) is generated.

In some embodiments, if it is detected that the new YarnPod (i.e., the YarnPod 712) is generated, the Kubernetes controller 721 may parse the generated YarnPod by performing the operation S730.

In S730, parsed data may be obtained by parsing the YarnPod using the Kubernetes controller.

In some embodiments, the YarnPod may include an annotation field. The parsed data may include a first prefix field and a second prefix field. The first prefix field may be a name prefix of a container group resource served by the data node. The second prefix field may be a prefix of a persistent volume mounted on the container group resource.

As shown in FIG. 7, in some embodiments, after the Kubernetes controller 721 detects that the new YarnPod resource (i.e., the YarnPod 712) is generated, the parsed data 731 may be obtained by parsing the annotation field in the YarnPod 712. The parsed data 731 may include the first prefix field and the second prefix field.

In some embodiments, the Kubernetes controller 721 may obtain address information (DataNode IP information) of a DataNodePod in a current environment based on a value of the first prefix field. In some embodiments, the Kubernetes controller 721 may inject the DataNode IP information into the container group resource through an environment variable.

In some embodiments, the Kubernetes controller 721 may obtain a PV prefix by parsing the second prefix field. The PV prefix may be the prefix of the PV mounted on the container group resource. In some embodiments, the Kubernetes controller 721 may select a PV with a same prefix as the PV prefix from a PV resource in combination with a load balancing strategy, so that the container group resource running on the same preset Node may be mounted to the same PV.

In some embodiments, the Kubernetes controller 721 may determine whether a PV exists on the Node. In response to a determination that no PV exists, the Kubernetes controller 721 may create a new PV based on the PV prefix corresponding to the second prefix field. In some embodiments, the Kubernetes controller 721 may create the container group resource based on the address information of the DataNodePod and the PV and mount the container group resource to the PV.

In some embodiments of the present disclosure, the PV prefix that needs to be mounted may be added in the description of the YarnPod, so that the Kubernetes controller may select the same PV for a plurality of Pods based on the PV prefix, which can easily realize the shared storage of the plurality of pods on the same Node, thereby realizing data sharing and improving the performance of data access.

In S740, the container group resource may be created based on the parsed data.

As shown in FIG. 7, in some embodiments, the Kubernetes controller 721 may create the container group resource (e.g., a container group resource 741) based on the address information of the DataNodePod in the current environment corresponding to the parsed data 731 and the PV.

In some embodiments, the created container group resource may have the following features: 1) PV information mounted on a mountPath may be selected by the Kubernetes controller; and 2) Two environment variables: DN_LIST (representing a corresponding relationship between the DataNode IP information and the Node in the current environment) and NODE (which Node the current container group resource is allocated to) may be injected. The environment variable DN_LIST and the environment variable NODE may help a client terminal in a HDFS cluster running in the Pod to select a most suitable data node to read and write data, which can improve the performance of data reading and writing.

In S750, the container group resource may be scheduled using the Kubernetes controller and the container group resource may be scheduled to a preset Node.

In some embodiments, the Kubernetes controller 721 may be used to schedule the container group resource 741 created by a NodeManager and schedule the container group resource 741 to a Node (e.g., a Node 751, a Node 752, a Node 753) deployed with a DataNodePod (e.g., a DataNodePod 751-1 and a DataNodePod 752-1) on the premise of ensuring load balancing. In FIG. 7, the container group resource 741 may be scheduled to the Node 751 deployed with the DataNodePod 751-1.

In some embodiments, the Kubernetes controller 721 may select a Node from all Nodes as the preset Node in combination with a load balancing strategy. The Node may be deployed with the DataNodePod. The container group resource corresponding to the Task that currently needs to be scheduled may be deployed to the preset Node. Specifically, on the basis of load balancing, the Kubernetes controller 721 may preferentially search for one or more Nodes deployed with a DataNodePod. For example, assuming that there are 3 Nodes and the container group resource corresponding to the Task includes 10 Pods, these 10 Pods may be preferentially deployed on the Nodes with DataNodePods and counts of Pods on the 3 Nodes may be similar, so that overall processing performance can be improved.

In some embodiments, the Kubernetes controller 721 may determine whether a ratio of a count of Nodes in a Kubernetes cluster to a count of the at least one container group corresponding to the Task is greater than a preset value. If the ratio of the count of Nodes to the total count of the container groups is greater than a preset value, all the container group resources corresponding to the Task may be scheduled to the same preset Node. For example, assuming that the count of Nodes is 100 and the count of container group resources corresponding to the Task is 10, these 10 container group resources may be preferentially deployed to the same Node with a DataNodePod. A specific value of the preset value may be preset according to a specific application scenario or experience.

In S760, a data node may be selected from all data nodes based on the environment variable using the client terminal to read and/or write the data to be processed.

In some embodiments, the HDFS cluster may also include the client terminal. The container group resource may be used to run the client terminal. In some embodiments, the client terminal may perceive whether the data node (e.g., the DataNodePod) corresponding to the obtained DataNode IP information is on the same Node as the client terminal through the environment variable of the container group resource (e.g., a ProcessPod). In some embodiments, if the client terminal determines that there is a data node on the same Node as the client terminal, a local data node (i.e., a data node of the Node) may be preferentially selected to read the data to be processed. The data to be processed may be HDFS data.

Specifically, a network segment of each Node may be different and the IP information of a component (e.g., the ProcessPod, the client terminal, the DataNodePod, etc.) arranged on the Node may be related to the network segment. For example, assuming that a network segment of a Node A is 128.a1.b1.c1, IP information of a data node D1 arranged on the Node A may be 128.a1.b1.c1.e1 and IP information of a client terminal U arranged on the Node A may be 128.a1.b1.c1.e2. Assuming that a network segment of a Node B is 192.a2.b2.c2, IP information of a data node D2 arranged on the Node B may be 192.a2.b2.c2.e3. By comparing the IP information, it may be known that the client terminal U and the data node D1 are located on the same Node and the client terminal U and the data node D2 are not located on the same Node.

In some embodiments, the client terminal may select a data node from all the data nodes as a candidate data node. In some embodiments, the client terminal may determine whether the obtained candidate data node is deployed on a same Node as the client terminal based on the environment variable. If the obtained candidate data node is deployed on the same Node as the client terminal, the data to be processed may be read and/or written using the candidate data node. If the candidate data node is not deployed on the same Node as the client terminal, the step of selecting a data node from all the data nodes as a candidate data node may be returned to until a preset termination condition is satisfied.

In some embodiments, the preset termination condition may include traversing all the data nodes in the Yarn cluster or determining that the candidate data node is deployed on the same Node as the client terminal. In some embodiments, if there is still no data node located on the same Node as the client terminal after all the data nodes are traversed, other strategies may be used to select the data node. For example, a data node may be randomly selected to read and write data to be processed, a data node on a Node closest to the client terminal may be selected to read and write data to be processed, or the like.

In some embodiments of the present disclosure, the mounting of PV and the environment variable injection may be completed by introducing a new application programming interface (API) resource (i.e., the YarnPod) and the new controller (i.e., the Yarndeployment), which can avoid the NodeManager from associating with an underlying PV and reduce the workload of the NodeManager. The resource such as a Java archive (Jar) package of a plurality of Pods, etc. may be shared by introducing the Kubernetes controller without using a manner of HostPath, which can help to improve the security and isolation of data reading and writing. In addition, when the HDFS data is read and written, the container group resource (e.g., ProcessPod) on the same Node may be selected for reading according to the environment variable, which can improve the program performance, and improve the performance of processing the distributed task in the hybrid deployment scheme of the Yarn and the Kubernetes. In addition, the local data may also be used preferentially, which can achieve data locality in the Kubernetes environment and save bandwidth costs in a private cloud usage scenario.

It should be noted that the above description about the processes 200, 400, 500, 600, and 700 is merely provided for the purpose of illustration, and not intended to limit the scope of application of the present disclosure. For persons having ordinary skills in the art, multiple variations and modifications may be made to the processes 200, 400, 500, 600, and 700 under the teachings of the present disclosure. However, those variations and modifications do not depart from the scope of the present disclosure. For example, in the operation S540, the Yarndeployment 522 may allocate the ProcessPod 531.

FIG. 8 is a schematic diagram illustrating an exemplary processing system in a distributed framework according to some embodiments of the present disclosure.

As shown in FIG. 8, in some embodiments, the processing system 800 in the distributed framework may include an obtaining module 810 and an allocation module 820.

In some embodiments, the obtaining module 810 may be configured to obtain a position of first data resource. The first data resource may be located on one or more Nodes. More descriptions about the first data resource and the manner for obtaining the position of the first data resource may be found in the relevant description of the operation S210, which will not be repeated herein.

In some embodiments, the allocation module 820 may be configured to allocate a ProcessPod to one of the one or more Nodes based on the position of the first data resource and record an allocation result. The ProcessPod may be a Pod obtained by encapsulating a Process. More descriptions about the manner for allocating the ProcessPod may be found in the relevant description of the operation S220, which will not be repeated herein.

FIG. 9 is a schematic diagram illustrating an exemplary processing system in another distributed framework according to some embodiments of the present disclosure.

As shown in FIG. 9, in some embodiments, the processing system 900 in the distributed framework may include a Task obtaining module 910, a resource generation module 920, and a resource scheduling module 930.

In some embodiments, the Task obtaining module 910 may be configured to obtain a Task. More descriptions about the manner for obtaining the Task may be found in the relevant description of the operation S610, which will not be repeated herein.

In some embodiments, the resource generation module 920 may be configured to create a Kubernetes controller and a Yarn Pod and process the Yarn Pod using the Kubernetes controller to obtain a container group resource. The Task may correspond to the YarnPod. More descriptions about the manner for generating the container group resource may be found in the relevant description of the operation S620, which will not be repeated herein.

In some embodiments, the resource scheduling module 930 may be configured to schedule the container group resource by using the Kubernetes controller and schedule the container group resource to a preset Node. The preset Node may be deployed with a DataNodePod. The DataNodePod may be a container group served by a data node in a HDFS cluster. More descriptions about the manner for scheduling the container group resource may be found in the relevant description of the operation S630, which will not be repeated herein.

The beneficial effects of embodiments of the present disclosure may include but are not limited to: (1) by encapsulating the process in the Yarn as the Pod in the Kubernetes, the hybrid scheduling architecture of the Yarn and the Kubernetes can be realized; (2) the ProcessPod corresponding to the Task may be obtained by processing the custom Yarn Pod using the custom Kubernetes controller and the generated ProcessPod may be scheduled to the Node with the DataNodePod, so that deployment and scheduling of the Task can be realized; (3) the scheduling logic may be controlled by the Kubernetes cluster using the Kubernetes controller to schedule the Task, thereby improving the balance of scheduling; and (4) the container group resource and the DataNodePod may be deployed on the same Node, so that the data node on the same Node may be directly used to read and write data, which can help to improve the performance of data reading and writing. It should be noted that different embodiments may have different beneficial effects. In different embodiments, the possible beneficial effects may include any combination of one or more of the above, or any other possible beneficial effects that may be obtained.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A processing method in a distributed framework, wherein the method is executed by a revised Kubernetes, the revised Kubernetes includes a ResourceManager, a Node-Manager, a Yarndeployment, and a Master, and the method comprises:
    obtaining a Task by the ResourceManager;
    generating a YarnPod based on the Task by the Node-Mangager;
    obtaining a position of first data resource by the Master, the first data resource being located on one or more Nodes;
    generating a ProcessPod by the Yarndeployment based on the position of the first data resource when the Yarndeployment detects that the YarnPod is generated, the ProcessPod being a Pod obtained by encapsulating a Process; and parsing the ProcessPod by the Master, allocating the ProcessPod to one of the one or more Nodes based on the position of the first data resource, and recording an allocation result.

2. The method of claim 1, wherein the first data resource includes one or more DataNodePods and the allocating the ProcessPod to one of the one or more Nodes based on the position of the first data resource and recording an allocation result includes:
    allocating the ProcessPod to a Node including a DataNodePod that satisfies a preset condition, the preset condition including that a preset position of the ProcessPod matches the position of the DataNodePod; and
    recording the Node to which the ProcessPod is allocated in the ProcessPod as at least part of the allocation result.

3. The method of claim 2, further comprising:
    determining a DataNodePod for access based on a corresponding relationship between the ProcessPod, the DataNodePod, and the Node in the allocation result.

4. The method of claim 1, further comprising:
    determining second data resource for mounting based on the allocation result.

5. The method of claim 4, wherein the second data resource includes a persistent volume (PV).

6. A system, comprising:
    a revised Kubernetes, the revised Kubernetes including a ResourceManager, a NodeManager, a Yarndeployment, and a Master, wherein
    the system is configured to perform operations including:
    obtaining a Task by the ResourceManager;
    generating a YarnPod based on the Task by the Node-Mangager;
    obtaining a position of first data resource by the Master, the first data resource being located on one or more Nodes;
    generating a ProcessPod by the Yarndeployment based on the position of the first data resource when the Yarndeployment detects that the YarnPod is generated, the ProcessPod being a Pod obtained by encapsulating a Process; and
    parsing the ProcessPod by the Master, allocating the ProcessPod to one of the one or more Nodes based on the position of the first data resource and recording an allocation result.

7. The system of claim 6, wherein the first data resource includes one or more DataNodePods and the allocating the ProcessPod to one of the one or more Nodes based on the position of the first data resource and recording an allocation result includes:
    allocating the ProcessPod to a Node including a DataNodePod that satisfies a preset condition, the preset condition including that a preset position of the ProcessPod matches the position of the DataNodePod; and
    recording the Node to which the ProcessPod is allocated in the ProcessPod as at least part of the allocation result.

8. The system of claim 7, the operations further comprising:
    determining a DataNodePod for access based on a corresponding relationship between the ProcessPod, the DataNodePod, and the Node in the allocation result.

9. The system of claim 6, the operations further comprising:
    determining second data resource for mounting based on the allocation result.

10. The system of claim 9, wherein the second data resource includes a persistent volume (PV).

11. A non-transitory computer readable medium, comprising executable instructions that, when executed by a revised Kubernetes, direct the revised Kubernetes to perform a method in a distributed framework, wherein the revised Kubernetes includes a ResourceManager, a NodeManager, a Yarndeployment, and a Master, and the method comprises:

obtaining a Task by the ResourceManager;

generating a YarnPod based on the Task by the Node-Mangager;

obtaining a position of first data resource by the Master, the first data resource being located on one or more Nodes;

generating a ProcessPod by the Yarndeployment based on the position of the first data resource when the Yarndeployment detects that the YarnPod is generated, the ProcessPod being a Pod obtained by encapsulating a Process; and parsing the ProcessPod by the Master, allocating the ProcessPod to one of the one or more Nodes based on the position of the first data resource, and recording an allocation result.

12. The non-transitory computer readable medium of claim 11, wherein the first data resource includes one or more DataNodePods and the allocating the ProcessPod to one of the one or more Nodes based on the position of the first data resource and recording an allocation result includes:

allocating the ProcessPod to a Node including a DataNodePod that satisfies a preset condition, the preset condition including that a preset position of the ProcessPod matches the position of the DataNodePod; and recording the Node to which the ProcessPod is allocated in the ProcessPod as at least part of the allocation result.

13. The non-transitory computer readable medium of claim 12, wherein the method further comprises:

determining a DataNodePod for access based on a corresponding relationship between the ProcessPod, the DataNodePod, and the Node in the allocation result.

14. The non-transitory computer readable medium of claim 11, wherein the method further comprises:

determining second data resource for mounting based on the allocation result.

15. The non-transitory computer readable medium of claim 14, wherein the second data resource includes a persistent volume (PV).

* * * * *